(12) United States Patent
Gray et al.

(10) Patent No.: US 9,313,180 B1
(45) Date of Patent: Apr. 12, 2016

(54) SYSTEMS AND METHODS FOR QUANTUM KEY GENERATION

(71) Applicant: Corning Incorporated, Corning, NY (US)

(72) Inventors: Stuart Gray, Corning, NY (US); Ming-Jun Li, Horseheads, NY (US); Daniel Aloysius Nolan, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/680,522

(22) Filed: Apr. 7, 2015

Related U.S. Application Data

(60) Provisional application No. 62/140,787, filed on Mar. 31, 2015.

(51) Int. Cl.
*H04L 9/00* (2006.01)
*H04K 1/00* (2006.01)
*H04L 29/06* (2006.01)
*H04W 12/04* (2009.01)

(52) U.S. Cl.
CPC ........... *H04L 63/0435* (2013.01); *H04W 12/04* (2013.01)

(58) Field of Classification Search
CPC ....... H04L 9/0883; H04L 9/0852; H04L 9/08; H04L 9/06; G06F 21/72
USPC ............. 713/189; 380/255, 256, 263, 44, 277
See application file for complete search history.

(56) References Cited

U.S. PATENT DOCUMENTS

| | | | | |
|---|---|---|---|---|
| 6,986,056 B1 * | 1/2006 | Dultz | ...................... | G06F 7/588 250/200 |
| 7,492,900 B2 * | 2/2009 | Yuan | ...................... | H04B 10/25 380/263 |
| 7,773,294 B2 | 8/2010 | Brunet et al. | | |
| 7,783,042 B2 * | 8/2010 | Maeda | .................. | H04L 7/0075 380/277 |

(Continued)

OTHER PUBLICATIONS

Nilsson et al.; "Solid state quantum memory using complete absorption and re-emission of photons by tailored and externally controlled inhomogeneous absorption profiles"; Optical Communications 247 (2005); pp. 393-403.

(Continued)

*Primary Examiner* — Hosuk Song
(74) *Attorney, Agent, or Firm* — Russell S. Magaziner

(57) ABSTRACT

A quantum key generation system including two photon detector units, two photon entanglement chains extending between the two photon detector units, and a plurality of multicore fiber links each including at least two non-uniform cores structurally configured to provide non-uniform photon propagation delay. Each photon entanglement chain includes at least one quantum repeater structurally configured to entangle a pair of photons and first and second terminating quantum memories optically coupled the quantum repeater using the multicore fiber links such that photons received by the first and the second terminating quantum memories are entangled with photons entangled by the quantum repeater. The first and second terminating quantum memories of each of the two photon entanglement chains form first and second cross-chain quantum repeaters, and the first and the second photon detector units are structurally configured to receive the measurable entangled particles generated by the first and second cross-chain quantum repeaters, respectively.

30 Claims, 4 Drawing Sheets

(56) References Cited

U.S. PATENT DOCUMENTS

| | | | | |
|---|---|---|---|---|
| 7,907,850 B2* | 3/2011 | Tanaka | ............... | H04B 10/505 380/255 |
| 2014/0099104 A1* | 4/2014 | Peters | ................. | H04B 10/70 398/25 |

OTHER PUBLICATIONS

Sangouard et al.; "Quantum repeaters based on atomic ensembles and linear optics"; Review of Modern Physics, vol. 83 Jan.-Mar. 2011; pp. 33-80.

Agarwal; Quantum Optics; Cambridge University Press: copyright 2013; pp. 108-109.

Duan et al.; "Long-distance quantum communication with atomic ensembles and linear optics"; Nature, vol. 414 Nov. 22, 2001; pp. 413-418.

Lauritzen et al.; "Approaches for a quantum memory at telecommunication wavelengths"; Physical Review A 83 (2011), pp. 012318-1-012318-12.

Lauritzen et al.; "State preparation by optical pumping in erbium-doped solids using stimulated emission and spin mixing"; Physical Review A 78 (2008); pp. 043402-1-043402-9.

Saglamyurek et al.; "Quantum storage of entangled telecom-wavelength photons in an erbium-doped optical fibre"; Nature Photonics, vol. 9 Feb. 2015; pp. 83-87.

Saglamyurek et al.; "Quantum storage of entangled telecom-wavelength photons in an erbium-doped optical fibre"; Supplementary Information; Nature Photonics, (2015); www.nature.com/naturephotonics; pp. 1-6.

Thiel et al.; "Rare-earth-doped materials for applications in quantum information storage and signal processing"; Journal of Luminescence 131 (2011); pp. 353-361.

\* cited by examiner

SYSTEMS AND METHODS FOR QUANTUM KEY GENERATION

This application claims the benefit of priority under 35 U.S.C. §119 of U.S. Provisional Application Ser. No. 62/140,787, filed on Mar. 31, 2015, the content of which is relied upon and incorporated herein by reference in its entirety.

BACKGROUND

The present disclosure relates to quantum key generation systems and methods of generating quantum keys. More specifically, the present disclosure relates to quantum key generation systems for providing increased quantum key bit rates.

BRIEF SUMMARY

According to the subject matter of the present disclosure, a quantum key generation system includes two photon detector units, two photon entanglement chains, and a plurality of multicore fiber links. Each photon entanglement chain extends between the two photon detector units. Each photon entanglement chain comprises at least one quantum repeater and first and second terminating quantum memories. The first and second terminating quantum memories are positioned at first and second ends of the photon entanglement chains, respectively. The quantum repeater of each photon entanglement chain is structurally configured to entangle a pair of photons. The plurality of multicore optical fiber links are structurally configured to optically couple the quantum repeater of each photon entanglement chain to the first and second terminating quantum memories of each photon entanglement chain such that photons received by the first and the second terminating quantum memories are entangled with photons entangled by the quantum repeater. The plurality of multicore optical fiber links each comprise at least two non-uniform cores structurally configured to provide non-uniform photon propagation delay. The first and second terminating quantum memories of each of the two photon entanglement chains form first and second cross-chain quantum repeaters, respectively, to generate measurable entangled particles at the cross-chain quantum repeaters. Additionally, the first and the second photon detector units are structurally configured to receive the measurable entangled particles generated by the first and second cross-chain quantum repeaters, respectively.

In accordance with one embodiment of the present disclosure, a quantum key generation system includes two photon entanglement chains, two photon detector units, and a plurality of multicore fiber links. Each photon entanglement chain extends between the two photon detector units. The plurality of multicore optical fiber links are structurally configured to optically couple a quantum repeater of each photon entanglement chain to first and second terminating quantum memories of each photon entanglement chain. Additionally, the two photon entanglement chains are structurally configured to generate correlative quantum key bits receivable by each photon detector unit at a bit rate of between about 1-100 MHz.

In accordance with another embodiment of the present disclosure, a quantum key generation system includes two photon entanglement chains, two photon detector units, and a plurality of multicore fiber links. Each photon entanglement chain extends between the two photon detector units. The plurality of multicore optical fiber links are structurally configured to optically couple a quantum repeater of each photon entanglement chain to first and second terminating quantum memories of each photon entanglement chain. Additionally, the two photon entanglement chains are structurally configured to generate correlative quantum key bits receivable by each photon detector unit at a bit rate $\Gamma$ that is within about 10% of a processing rate $\Pi$ of the at least one quantum repeater.

In accordance with yet another embodiment of the present disclosure, a quantum key generation system comprising two photon entanglement chains, two photon detector units, and a plurality of multicore fiber links. Each photon entanglement chain extends between the two photon detector units. The plurality of multicore optical fiber links are structurally configured to optically couple a quantum repeater of each photon entanglement chain to first and second terminating quantum memories of each photon entanglement chain. Additionally, the two photon entanglement chains are structurally configured to generate correlative quantum information receivable by each photon detector unit at a bit rate $\Gamma$ that is within about 10% of a processing rate $\Pi$ of the at least one quantum repeater.

Although the concepts of the present disclosure are described herein with primary reference to quantum key generation, it is contemplated that the concepts will enjoy applicability to any quantum information communication.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
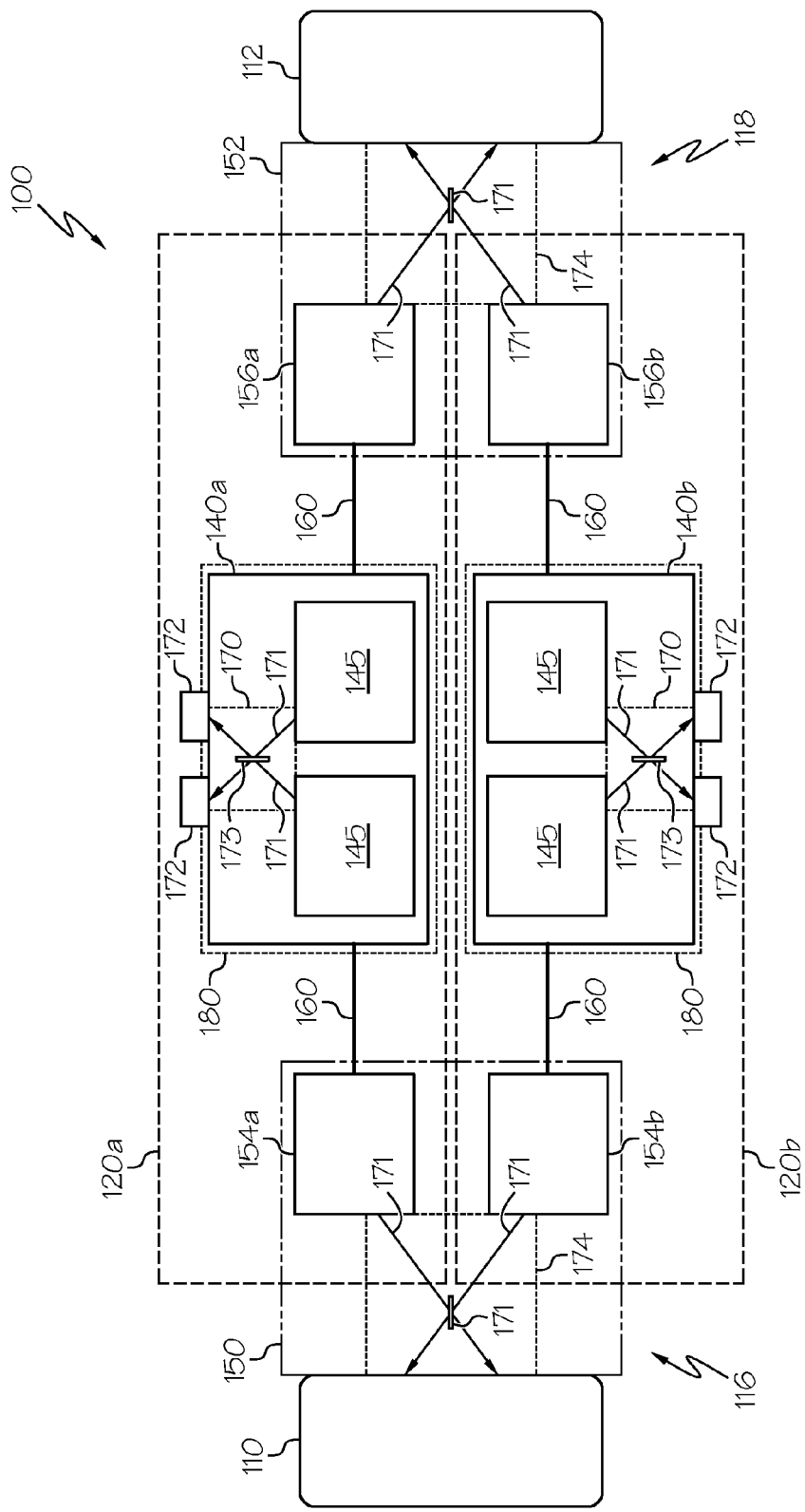
FIG. 1 schematically depicts a quantum key generation system including at least one quantum repeater according to one or more embodiments shown and described herein.

Referring initially to FIG. 1, a quantum key generation system 100 comprising two photon detector units 110, 112, two photon entanglement chains 120a, 120b, and a plurality of optical fiber links 160 is depicted. Each photon entanglement chain 120a, 120b extends between the two photon detector units 110, 112 and each photon entanglement chain 120a, 120b comprises at least one quantum repeater 140a, 140b and first and second terminating quantum memories 154a, 154b, 156a, 156b.

The quantum repeater 140a, 140b of each photon entanglement chain 120a, 120b may be structurally configured to entangle a pair of photons. For example, the at least one quantum repeater 140a, 140b may comprise two quantum memories 145 and entanglement optics 170. The entanglement optics 170 may include two or more entangling pathways 171 optically coupled to and extending between the two quantum memories 145 and two entanglement detectors 172. The entanglement detectors 172 may comprise single-photon detectors, e.g., superconducting nanowire single-photon detectors. The entanglement detectors 172 may also comprise low noise photodiodes. The entanglement optics 170 may further comprise a beamsplitter 173 positioned such that each entangling pathway 171 traverses the beamsplitter 173. The entanglement optics 170 may be structurally configured to entangle pairs of particles when particles output by the quantum memories 145 simultaneously traverse the beamsplitter 173. Further, the entanglement optics 170 may be housed within an optical waveguide, and in some embodiments, the at least one quantum repeater 120, 120b, the entanglement optics 170, and the entanglement detectors 172 may form a photonic integrated circuit. In alternative embodiments, the quantum repeaters 140a, 140b may comprise entanglement optics 170 without quantum memories 145, for example, entanglement optics 170 structurally configured to entangle pair of particles, such as photons, received by the quantum repeaters 140a, 140b.

Referring still to FIG. 1, the first and second terminating quantum memories 154a, 154b, 156a, 156b may be positioned at first and second ends 116, 118 of the photon entanglement chains 120a, 120b, respectively. The first and second terminating quantum memories 154a, 154b, 156a, 156b of each of the two photon entanglement chains 120a, 120b may form first and second cross-chain quantum repeaters 150, 152 including terminating entanglement optics 174 optically coupled to the first and second photon detector units 110, 112. The first and second cross-chain quantum repeaters 150, 152 may be structurally configured to generate measurable entangled particles and the first and the second photon detector units 110, 112 may be structurally configured to receive the measurable entangled particles. In alternative embodiments, the first and second cross-chain quantum repeaters 150, 152 may comprise terminating entanglement optics 174 without terminating quantum memories 154a, 154b, 156a, 156b, for example, terminating entanglement optics 174 structurally configured to entangle pair of particles, such as photons, received by the cross-chain quantum repeaters 150, 152.

In some embodiments, the plurality of optical fiber links 160 may be structurally configured to optically couple the at least one quantum repeater 140a, 140b of each photon entanglement chain 120a, 120b to the first and second terminating quantum memories 154a, 154b, 156a, 156b of each photon entanglement chain 120a, 120b such that photons received by the first and the second terminating quantum memories 154a, 154b, 156a, 156b, or, in the alternative, received by the terminating entanglement optics 174 of the first and second cross-chain repeaters 150, 152, are entangled with photons entangled by the at least one quantum repeater 140a, 140b. Further, the optical fiber links 160 may comprise single core optical fiber links 160 and/or multicore optical fiber links 160 having at least two non-uniform cores structurally configured to provide non-uniform photon propagation delay. For example, the at least two non-uniform cores may comprise differing core lengths, differing diameters, differing refractive indices, or any other non-uniform properties to facilitate non-uniform photon propagation delay, as described in more detail with respect to FIG. 4, below.

In some embodiments, the photon entanglement chains 120a, 120b may include multicore optical fibers 160 and at least two quantum repeaters disposed between the first and second terminating quantum memories 154a, 154b, 156a, 156b of each photon entanglement chain 120a, 120b. The at least two quantum repeaters may be adjacently positioned and optically coupled by the multicore optical fiber links 160. In this embodiment, the photon entanglement chain 100 may be structurally configured in the DLCZ protocol for quantum repeaters, as described in Duan et al., Nature, 414, 22 Nov. 2001, pgs 413-418 and as described in Sangouard et. al., "Quantum repeaters based on atomic ensembles and linear optics," Review of Modern Physics, Vol. 83, 2011, pgs 34-73. In operation, the core length of the optical fiber links 160 may be altered by outside factors, such as temperature. By providing multicore optical fiber links 160 comprising at least two non-uniform cores structurally configured to provide non-uniform photon propagation delay, cores having matching core lengths may be aligned with the at least two quantum repeaters, even when outside factors alter the core lengths.

Referring still to FIG. 1, the quantum key generation system 100 may further comprise one or more alignment mechanisms 180 structurally configured to optically align the at least one quantum repeater 140a, 140b with individual cores of the multicore optical fiber links 160 such that the at least one quantum repeater 140a, 140b may be selectively positioned in optical alignment with an individual core of the multicore optical fiber links 160. In some embodiments, the one or more alignment mechanisms 180 may comprise an alignment stage, an optical switch, or both.

Figure 2:
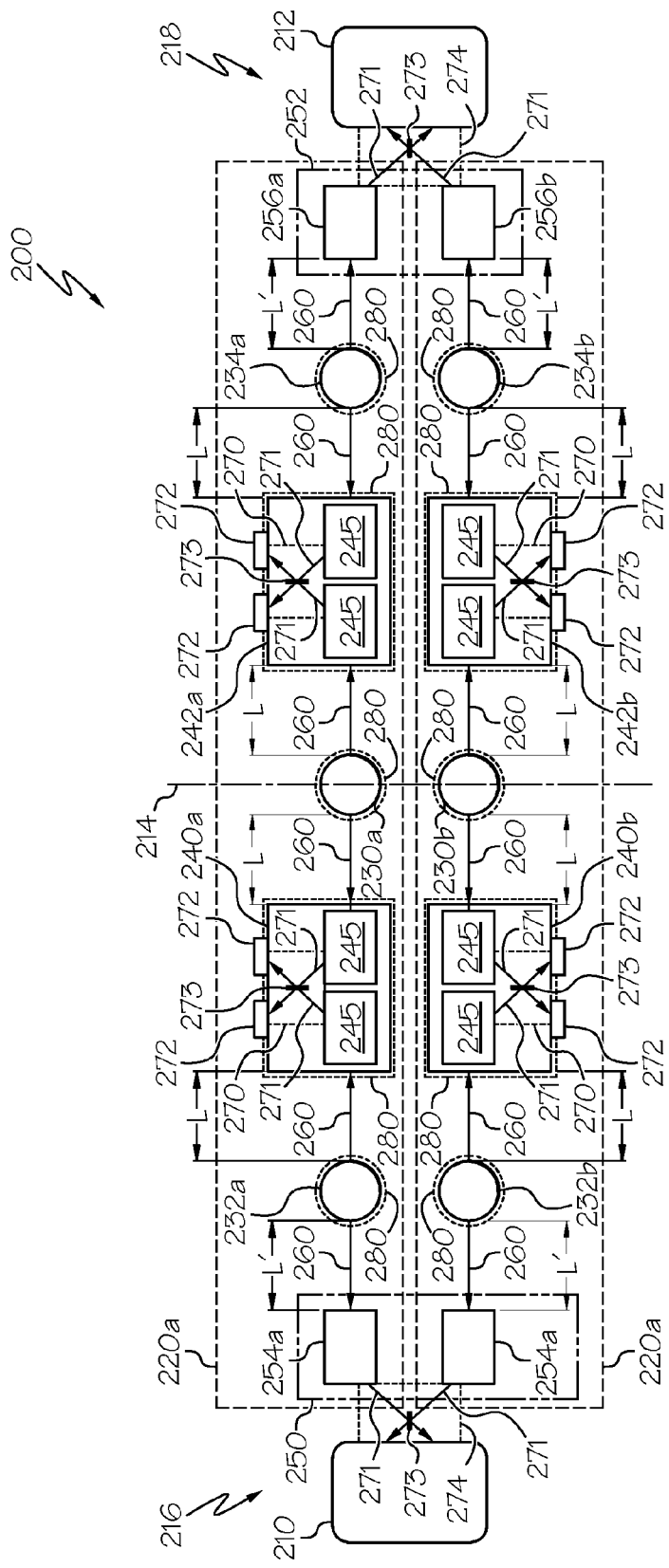
FIG. 2 schematically depicts a quantum key generation system including an originating entangled photon generator according to one or more embodiments shown and described herein.

Referring now to FIG. 2, a quantum key generation system 200 comprising two photon detector units 210, 212 and two photon entanglement chains 220a, 220b is depicted. Each photon entanglement chain 220a, 220b extends between the two photon detector units 210, 212 and comprises an originating entangled photon generator 230a, 230b, first and second intermediate entangled photon generators 232a, 232b, 234a, 234b, first and second intermediate quantum repeaters 240a, 240b, 242a, 242b, and first and second terminating quantum memories 254a, 254b, 256a, 256b. The first and second terminating quantum memories 254a, 254b, 256a, 256b are positioned at first and second ends 216, 218 of the photon entanglement chains 220a, 220b, respectively. The originating entangled photon generators 230a, 230b are positioned at respective origination locations 214 between the first and second ends 216, 218 of the photon entanglement chains 220a, 220b.

The originating entangled photon generators 230a, 230b, the first intermediate entangled photon generators 232a, 232b, and the second intermediate entangled photon generators 234a, 234b are each structurally configured to generate an entangled pair of photons, for example, using a parametric down conversion process. In some embodiments, the entangled photon generators may each comprise a laser source optically coupled to a non-linear crystal. In other embodiments, the entangled photon generators may be structurally configured to generate an entangled pair of photons using a four-wave mixing process, or any method or process of generating an entangled pair of photons. Further, each of the entangled photon generators may be structurally configured to provide entangled photons having any wavelength λ, for example, between about 800 and about 1800 nm, for example about 1550 nm.

Referring still to FIG. 2, the first and second intermediate quantum repeaters 240a, 240b, 242a, 242b of each photon entanglement chain 220a, 220b may be optically coupled to the originating entangled photon generator 230a, 230b of the photon entanglement chains 220a, 220b by optical fiber links 260 of core length L and optically coupled to first and second intermediate entangled photon generators 232a, 232b, 234a, 234b of each photon entanglement chain 220a, 220b by optical fiber links 260 of core length L. It should be understood that optical fiber links 260 may comprise any optical fibers, for example, single core optical fibers, multicore optical fibers, or the like.

The first and second intermediate quantum repeaters 240a, 240b, 242a, 242b of each photon entanglement chain 220a, 220b may each receive, for example, simultaneously receive an individual photon of the entangled pair of photons output by the originating entangled photon generators 230a, 230b and an individual photon output by one of the first or second intermediate entangled photon generators 232a, 232b, 234a, 234b. By providing optical fiber links 260 having core lengths L, the first and second intermediate quantum repeaters 240a 240a, 240b, 242a, 242b may be structurally configured to entangle the received photons upon simultaneous arrival, without delay. In operation, the core length of the optical fiber links 260 may be altered by outside factors, such as temperature. By providing multicore optical fiber links 260 comprising at least two non-uniform cores structurally configured to provide non-uniform photon propagation delay, cores having matching core lengths may be aligned with the first and second intermediate quantum repeaters 240a 240a, 240b, 242a, 242b, even when outside factors alter the core lengths.

Referring still to FIG. 2, the quantum key generation system 200 may further comprise one or more alignment mechanisms 280 structurally configured to optically align the components of the photon entanglement chains 220a, 220b with individual cores of the multicore optical fiber links 260 such that any of the components may be selectively positioned in optical alignment with an individual core of the multicore optical fiber links 260. In some embodiments, the one or more alignment mechanisms 280 may comprise an alignment stage, an optical switch, or both. In some embodiments, the one or more quantum repeaters of the photon entanglement chains 220a, 220b are coupled to alignment mechanisms 280. In some embodiments, the one or more entangled photon generators of the photon entanglement chains 220a, 220b are coupled to alignment mechanisms 280.

Referring still to FIG. 2, the first and second intermediate quantum repeaters 240a, 240b, 242a, 242b of each photon entanglement chain 220a, 220b may be structurally configured such that an entangled pair of photons generated by the originating entangled photon generator 230a, 230b may be entangled with an entangled pair of photons generated by the first and second intermediate entangled photon generators 232a, 232b, 234a, 234b, respectively. For example, in some embodiments, the first and second intermediate quantum repeaters 240a, 240b, 242a, 242b of each photon entanglement chain 220a, 220b may each comprise two quantum memories 245 and entanglement optics 270.

The entanglement optics 270 may include two entangling pathways 271 optically coupled to and extending between the two quantum memories 245 and two entanglement detectors 272. Further, the entanglement detectors 272 may comprise single-photon detectors, such as superconducting nanowire single-photon detectors, low noise photodiodes, or the like. The entanglement optics 270 may further comprise a beamsplitter 273 positioned such that each entangling pathway 271 traverses the beamsplitter 273. The entanglement optics 270 may be structurally configured to entangle pairs of particles when particles output by the quantum memories 245 simultaneously traverse the beamsplitter 273, for example, a pair of Stokes photons or a pair of anti-Stokes photons output by the quantum memories 245. Further, the entanglement optics 270 may be housed within an optical waveguide and the individual intermediate quantum repeater 240a, 240b, 242a, 242b, the associated entanglement optics 270, and the associated entanglement detectors 272 may form a photonic integrated circuit. In alternative embodiments, the first and second intermediate quantum repeaters 240a, 240b, 242a, 242b may comprise entanglement optics 270 without quantum memories 245, for example, entanglement optics 270 structurally configured to entangle pair of particles, such as photons, received by the first and second intermediate quantum repeaters 240a, 240b, 242a, 242b.

In operation, the first and second intermediate quantum repeaters 240a, 240b, 242a, 242b of each photon entanglement chain 220a, 220b may receive an individual entangled photon generated by one of the originating entangled photon generators 230a, 230b, receive an individual entangled photon generated by the first and second intermediate entangled photon generators 232a, 232b, 234a, 234b of one of the photon entanglement chains 220a, 220b, respectively, and entangle the received photons. For example, the first intermediate quantum repeaters 240a, 240b may receive an individual entangled photon generated by the originating entangled photon generator 230a, 230b and may receive an individual entangled photon generated by the first intermediate entangled photon generators 232a, 232b. The second intermediate quantum repeaters 242a, 242b may receive an individual entangled photon generated by the originating entangled photon generator 230a, 230b and may receive an individual entangled photon generated by the second intermediate entangled photon generators 234a, 234b.

The first and second intermediate entangled photon generators 232a, 232b, 234a, 234b of each photon entanglement chain 220a, 220b may be optically coupled to the first and the second terminating quantum memories 254a, 254b, 256a, 256b, respectively, of the photon entanglement chains 220a, 220b by optical fiber links 260 of core length L', where L'>L. The core length L' allows photon entanglement to occur at the first and second intermediate quantum repeaters 240a 240a, 240b, 242a, 242b while individual entangled photons of the pair of entangled photons output by the first and second intermediate entangled photon generators 232a, 232b, 234a, 234b are traveling though the optical fiber link 260 having core length L'. Accordingly, when the photons reach the first and the second terminating quantum memories 254a, 254b, 256a, 256b, the photon arriving at the first terminating quantum memory 254a, 254b of a respective photon entanglement chain 220a, 220b, may be entangled with the photon arriving at the second terminating quantum memory 256a, 256b of the same photon entanglement chain 220a, 220b.

Referring still to FIG. 2, the first and second terminating quantum memories 254a, 254b, 256a, 256b of each of the two photon entanglement chains 220a, 220b form first and second cross-chain quantum repeaters 250, 252, respectively, structurally configured to generate measurable entangled particles. In operation, the cross-chain quantum repeaters 250, 252 entangle photons from each photon entanglement chain 220a, 220b. For example, the first and second cross-chain quantum repeaters 250, 252 may receive photons generated by the first and the second intermediate entangled photon generators 232a, 232b, 234a, 234b of each photon entanglement chain 220a, 220b, respectively, entangle the received photons such that an entangled pair of photons generated by the first and second intermediate entangled photon generators 232a, 232b, 234a, 234b of each photon entanglement chain 220a, 220b are entangled, and generate a measurable entangled particle measurable by the photon detector units 210, 212.

Referring still to FIG. 2, the first and second cross-chain quantum repeaters 250, 252 of each photon entanglement chain 220a, 220b may further comprise terminating entanglement optics 274 including one or more entangling pathways 271 optically coupled to and extending between the terminating quantum memories 254a, 254b, 256a, 256b and the photon detector units 210, 212. The terminating entanglement optics 274 may also include a beamsplitter 273 positioned such that each entangling pathway 271 traverses the beamsplitter. In some embodiments, the terminating entanglement optics 274 may comprise the same components as the entanglement optics 270 and may be positioned at the first end 216 and the second end 218 of the photon entanglement chains 220a, 220b. The terminating entanglement optics 274 may be structurally configured to entangle pairs of particles when particles output by the terminating quantum memories 254a, 254b, 256a, 256b simultaneously traverse the beamsplitter 273. In some embodiments, the terminating entanglement optics 274 may be housed within an optical waveguide. Additionally, the first and second cross-chain quantum repeaters 250, 252, the terminating entanglement optics 274, and the photon detector units 210, 212 may form photonic integrated circuits. In alternative embodiments, the first and second cross-chain quantum repeaters 250, 252 may comprise terminating entanglement optics 274 without terminating quantum memories 254a, 254b, 256a, 256b, for example, terminating entanglement optics 274 structurally configured to entangle pair of particles, such as photons, received by the cross-chain quantum repeaters 250, 252.

Referring still to FIG. 2, the first and the second photon detector units 210, 212 are structurally configured to receive the measurable entangled particles generated by the first and second cross-chain quantum repeaters 250, 252, respectively. In some embodiments, each photon detector unit 210, 212 comprises a pair of photon detectors positioned in optical alignment with the terminating quantum memories 254a, 254b, 256a, 256b, and/or the terminating entanglement optics 274 such that a particle generated by an individual terminating quantum memory 254a, 254b, 256a, 256b is received by an individual photon detector. Additionally, the photon detector units 210, 212 may comprise one or more low noise photodiodes and/or one or more single-photon detectors, such as, for example, one or more superconducting nanowire single-photon detectors. In some embodiments, the photon detector units 210, 212 may comprise the same detectors as the entanglement detectors 272; however, any combination of detectors disposed in the quantum key generation system 200 is contemplated.

In operation, the measurable entangled particles generated by the first and the second cross-chain quantum repeaters 250, 252 are entangled by the terminating entanglement optics 274 such that each photon detector unit 210, 212 measures a correlative entangled particle property of the measurable entangled particles. The measurable entangled particles received by each photon detector unit 210, 212 share a quantum state such that measurement of a correlative entangled particle property at the first end 216 correlates with the measurement of a correlative entangled particle property at the second end 218. The correlative entanglement particle property may comprise any measurable quantum property of the measurable entangled particle, for example a linear polarization, a circular polarization, spin, translational momentum, orbital angular momentum, or the like.

In some embodiments, the quantum key generation system 200 may comprise additional quantum repeaters and additional entangled photon generators positioned between the originating location 214 and the first end 216 and positioned between the originating location 214 and the second end 218. The additional quantum repeaters and the additional entangled photon generators may be alternately disposed. Each additional quantum repeater may be disposed between and optically coupled to adjacent entangled photon generators using optical fiber links 260. Each additional entangled photon generator may be disposed between and optically coupled to an additional quantum repeater and one of another additional quantum repeater or an individual terminating quantum memory 254a, 254b, 256a, 256b using optical fiber links 260.

Any number of additional quantum repeaters and additional entangled photon generators optically coupled using optical fiber links 260 are contemplated to increase the length of the photon entanglement chains 220a, 220b, while minimizing signal attenuation between the origination location 214 and the first and second ends 216, 218. Additionally, the pair of optical fiber links 260 that are optically coupled to any one individual quantum repeater may comprise substantially equivalent core lengths such that the individual quantum repeater may simultaneously receive individual photons output by adjacent entangled photon generators. In some embodiments, the pair optical fiber links 260 that are optically coupled to each quantum repeater positioned increasingly outward from the origination location 214 may comprise increasingly lengthened core lengths (e.g., L, L', L", L''', etc.).

In operation, when entangled pairs of photons are simultaneously output by each entangled photon generator, each quantum repeater positioned increasingly outward from the origination location 214 receives photons output by adjacent entangled photon generators after the quantum repeaters positioned closer to the origination location 214 receive and entangle photons. Accordingly, photons traveling away from the origination location 214 become entangled while traversing the optical fiber links 260. This generates a cascading chain of entanglement swapping such that photons received by the terminating quantum memories 254a, 254b at the first end 216 of an individual photon entanglement chain 220a, 220b are entangled, upon arrival, with photons received by the terminating quantum memories 256a, 256b at the second end 218 of the same photon entanglement chain 220a, 220b.

Further, the optical fiber links 260 that are optically coupled to the terminating quantum memories 254a, 254b, 256a, 256b may have the longest core length of the plurality of optical fiber links 260 and the optical fiber links 260 that are optically coupled to the first and second intermediate quantum repeaters 240a 240a, 240b, 242a, 242b may comprise the shortest core length of the plurality of optical fiber links 260.

Referring still to FIG. 2, the correlative entangled particle property measured by each photon detector unit 210, 212 may be converted into a correlative quantum key bit. Each correlative quantum key bit may comprise a binary bit, e.g., a "1" bit or a "0" bit. In some embodiments, the correlative entangled particle property measured by each photon detector unit 210, 212 may comprise a coordinate entangled particle property such that each correlative quantum key bit produced at each photon detector unit comprises a matching binary bit. For example, when the photon detector unit 210 measures a coordinate entanglement property that comprises a "0" bit, the photon detector unit 212 may also measures a coordinate entanglement property that comprises a "0" bit. In other embodiments, the correlative entangled particle property measured by each photon detector unit comprises an orthogonal entangled particle property such that each correlative quantum key bit produced at each photon detector unit comprises an opposite binary bit. For example, when the photon detector unit 210 measures an orthogonal entanglement property that comprises a "0" bit, the photon detector unit 212 also measures an orthogonal entanglement property that comprises a "1" bit.

In some embodiments, the correlative entangled particle property may comprise any quantum information, for example, with or without converting the correlative entangled particle property into a correlative quantum key bit. For example, the photon entanglement chains 220a, 220b are structurally configured to communicate any quantum information between separate locations, for example, between the originating location 214 and one or both of the first end 216 and the second end 218 and between the first and second ends 216, 218. Further, each of the photon entanglement chains 110a, 110b, (FIG. 1) 220a, 220b (FIG. 2), 320a, 320b (FIG. 3) are structurally configured to communicate any quantum information between separate locations by generating particles comprising entangled quantum states and transmitting the entangled quantum states to and between separate locations. In some embodiments, each pair of photon entanglement chains 110a, 110b, (FIG. 1) 220a, 220b (FIG. 2), 320a, 320b (FIG. 3) described herein may be structurally configured as a one-time key pad that operates to communicate quantum information. In a non-limiting example, the quantum communication may comprise any measurable quantum property of the measurable entangled particle, for example a linear polarization, a circular polarization, spin, translational momentum, orbital angular momentum, or the like.

In operation, the photon entanglement chains 220a, 220b are structurally configured to produce correlative quantum key bits or other quantum information at a bit rate $\Gamma$ of between about 1-100 MHz, for example, between about 50-100 MHz. The photon entanglement chains 220a, 220b may be structurally configured to produce correlative quantum key bits or other quantum information at a bit rate $\Gamma$ that is near or substantially equivalent (e.g., within about 1%) to a processing rate $\Pi$ of each quantum repeater such that $\Gamma_{MAX} \leq \Pi_{MAX}$. For example, the bit rate $\Gamma$ may be within about 10% of the processing rate $\Pi$, within about 5% of the processing rate $\Pi$, or within about 1% of the processing rate $\Pi$. For example, the bit rate $\Gamma$ may be increased by providing quantum repeaters structurally configured to entangle photons at an increased processing rate $\Pi$. By increasing the bit rate $\Gamma$ of the photon entanglement chains 220a, 220b, correlative quantum key bits may be generated at high rates allowing quantum keys to be formed quickly with large numbers of bits, increasing the complexity of the quantum key.

Further, in operation, a plurality of iteratively converted correlative quantum key bits may form a quantum key at each photon detector unit 210, 212. For example, each photon detector unit 210, 212 may convert iteratively received correlative quantum key bits into a set of correlative binary bits, such that each photon detector unit 210 and 212 may receive a quantum key correlated with the quantum key received by the other photon detector unit 210, 212. This allows the quantum key to be used as a cryptography key such that communication between the first end 216 and the second end 218 over classical communication channels may be encrypted with the quantum key. Additionally, some embodiments may comprise electronic storage devices communicatively coupled to the photon detector units 210, 212 and structurally configured to electronically store the correlative quantum key bits. In other embodiments, the photon detector units 210, 212 may be structurally configured to electronically store the quantum key.

Figure 3:
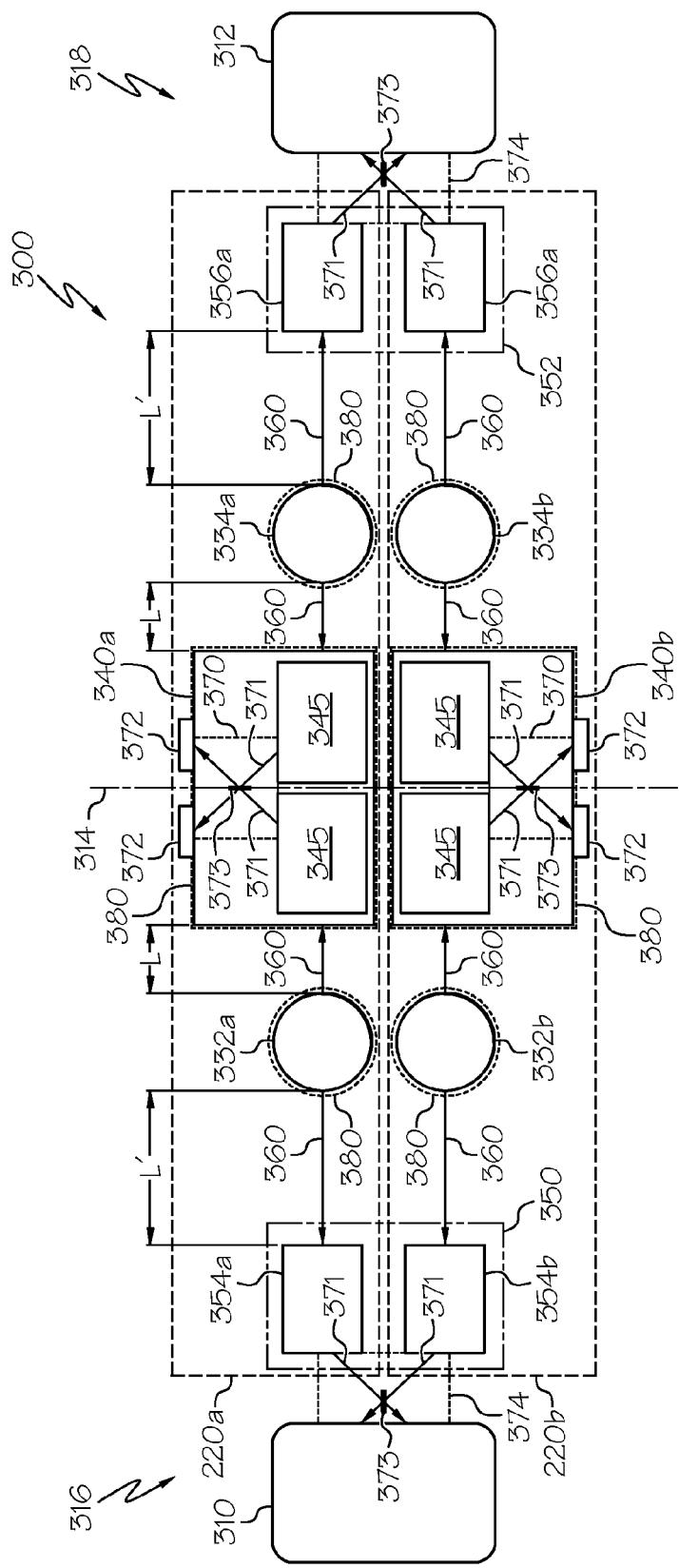
FIG. 3 schematically depicts another quantum key generation system including an originating quantum repeater according to one or more embodiments shown and described herein.

Referring now to FIG. 3, another quantum key generation system 300 is depicted comprising two photon detector units 310, 312 and two photon entanglement chains 320a, 320b. Each photon entanglement chain 320a, 320b extends between the two photon detector units 310, 312. In this embodiment, each photon entanglement chain 320a, 320b comprises an originating quantum repeater 340a, 340b, first and second intermediate entangled photon generators 332a, 332b, 334a, 334b, and first and second terminating quantum memories 354a, 354b, 356a, 356b. The first and second terminating quantum memories 354a, 354b, 356a, 356b are positioned at first and second ends 316, 318 of the photon entanglement chains, respectively.

The originating quantum repeaters 340a, 340b are positioned at respective origination locations 314 between the first and second ends 316, 318 of the photon entanglement chains 320a, 320b. The originating quantum repeaters 340a, 340b may comprise two quantum memories 345 optically coupled to the first and second intermediate entangled photon generators 332a, 332b, 334a, 334b of each photon entanglement chain 320a, 320b by optical fiber links 360 of core length L. Further, the optical fiber links 360 may comprise any optical fiber links, for example, single core optical fiber links and/or multicore optical fiber links 360 having at least two non-uniform cores structurally configured to provide non-uniform photon propagation delay. For example, the at least two non-uniform cores may comprise differing core lengths, differing diameters, differing refractive indices, or any other non-uniform properties to facilitate non-uniform photon propagation delay.

The first and second intermediate entangled photon generators 332a, 332b, 334a, 334b of each photon entanglement chain 320a, 320b are optically coupled to the first and the second terminating quantum memories 354a, 354b, 356a, 356b, respectively, of the photon entanglement chains 320a, 320b by optical fiber links 360 of core length L', where L'>L. The first and second intermediate entangled photon generators 332a, 332b, 334a, 334b are each structurally configured to generate an entangled pair of photons and may comprise any of the entangled photon generators described above with respect to the quantum key generation system 200.

Referring still to FIG. 3, the quantum key generation system 300 may further comprise one or more alignment mechanisms 380 structurally configured to optically align the components of the photon entanglement chains 320a, 320b with individual cores of the multicore optical fiber links 360 such that any of the components may be selectively positioned in optical alignment with an individual core of the multicore optical fiber links 360. In some embodiments, the one or more alignment mechanisms 380 may comprise an alignment stage, an optical switch, or both. In some embodiments, the originating quantum repeater 340a, 340b of the photon entanglement chains 320a, 320b are coupled to alignment mechanisms 380. In some embodiments, the one or more entangled photon generators of the photon entanglement chains 320a, 320b are coupled to alignment mechanisms 380.

The originating quantum repeaters 340a, 340b of each photon entanglement chain 320a, 320b may be structurally configured such that an entangled pair of photons generated by the first intermediate entangled photon generators 332a, 332b are entangled with an entangled pair of photons generated by the second intermediate entangled photon generators 334a, 334b, respectively. For example, the originating quantum repeater 340a, 340b of each photon entanglement chain 320a, 320b may comprise two quantum memories 345 and entanglement optics 370 including two entangling pathways 371. The entangling pathways 371 are each optically coupled to and extend between one of the two quantum memories 345 and one of two entanglement detectors 372. The entanglement optics 370 may also include a beamsplitter 373 positioned such that each entangling pathway 371 traverses the beamsplitter 373. Further, the entanglement optics 370 are structurally configured to entangle pairs of particles output by the quantum memories 345 when the pair of particles simultaneously traverse the beamsplitter, as described above with respect to quantum key generation system 200. In alternative embodiments, the originating quantum repeaters 340a, 340b may comprise entanglement optics 370 without quantum memories 345, for example, entanglement optics 370 structurally configured to entangle pair of particles, such as photons, received by the originating quantum repeaters 340a, 340b.

The first and second terminating quantum memories 354a, 354b, 356a, 356b of each of the two photon entanglement chains 320a, 320b may form first and second cross-chain quantum repeaters 350, 352, respectively, structurally configured to generate measurable entangled particles. The first and second cross-chain quantum repeaters 350, 352 may comprise terminating entanglement optics 374 and may be the first and second cross-chain quantum repeaters 250, 252, as described above with respect to quantum key generation system 200.

Referring still to FIG. 3, first and the second photon detector units 310, 312 may be structurally configured to receive the measurable entangled particles generated by the first and second cross-chain quantum repeaters 350, 352, respectively. The photon detector units 310, 312 may comprise any of the photon detectors described above with respect to quantum key generation systems 100 and 200. Further each photon detector unit 310, 312 may comprise a pair of photon detectors positioned in optical alignment with the terminating quantum memories 354a, 354b, 356a, 356b such that a particle generated by an individual terminating quantum memory 354a, 354b, 356a, 356b is received by an individual photon detector 310, 312.

In operation, the measurable entangled particles generated by the first and the second cross-chain quantum repeaters 350, 352 are entangled by the terminating entanglement optics 374 such that each photon detector unit 310, 312 may be a correlative entangled particle property of the measurable entangled particles, converts the correlative entangled particle property into a correlative quantum key bit, and generates a quantum key as described above with respect to quantum key generation system 200.

Further, in some embodiments, the quantum key generation system 300 may comprise additional quantum repeaters and additional entangled photon generators positioned between the originating location 314 and the first end 316 and positioned between the originating location 314 and the second end 318, as described above with respect to quantum key generation system 200.

In operation, the photon entanglement chains 320a, 320b are structurally configured to produce correlative quantum key bits at a bit rate Γ of between about 1-100 MHz, for example, between about 50-100 MHz. The photon entanglement chains 320a, 320b may be structurally configured to produce correlative quantum key bits at a bit rate Γ that is near or substantially equivalent (e.g., within about 1%) to a processing rate Π of each quantum repeater such that Γ$_{MAX}$≤Π$_{MAX}$. For example, the bit rate Γ may be within about 10% of the processing rate Π, within about 5% of the processing rate Π, or within about 1% of the processing rate Π. For example, the bit rate Γ may be increased by providing quantum repeaters structurally configured to entangle photons at an increased processing rate Π. By increasing the bit rate Γ of the photon entanglement chains 320a, 320b, correlative quantum key bits may be generated at high rates allowing quantum keys to be formed quickly with increasing numbers of bits, increasing the complexity of the quantum key.

Referring again to FIGS. 1-3, when the optical fiber links 160, 260, 360 comprise multicore optical fiber links, individual cores of the multicore optical fiber links 160, 260, 360 may provide photon propagation pathways for one of the photon entanglement chains 120a, 220a, 320a and other individual cores of the same multicore optical fiber link 160, 260, 360 may provide photon propagation pathways for another of the photon entanglement chains 120b, 220b, 320b.

Referring still to FIGS. 1-3, the optical fiber links 160, 260, 360 may be structurally configured to receive a calibration signal from an optical time-domain reflectometer, or the like, for measurement of the core length of the optical fiber links 160, 260, 360. This allows actual core lengths of the optical fiber links 160, 260, 360 to be determined such that cores having the desired core lengths L, L', L", L"', etc. may be optically coupled to the components of the photon entanglement chains, even when outside factors (e.g., temperature, or the like) alter the core lengths of the individual cores. By providing optical fiber links 260 having desired core lengths L, L', L", L"', etc., the bit rate Γ of the photon entanglement chains 110a, 110b, 220a, 220b, 320a, 320b may not be slowed by misaligned cores. This alignment allows the bit rate Γ$_{MAX}$ to be substantially equivalent (e.g., within about 1%) Π$_{MAX}$, as discussed above.

Figure 4:
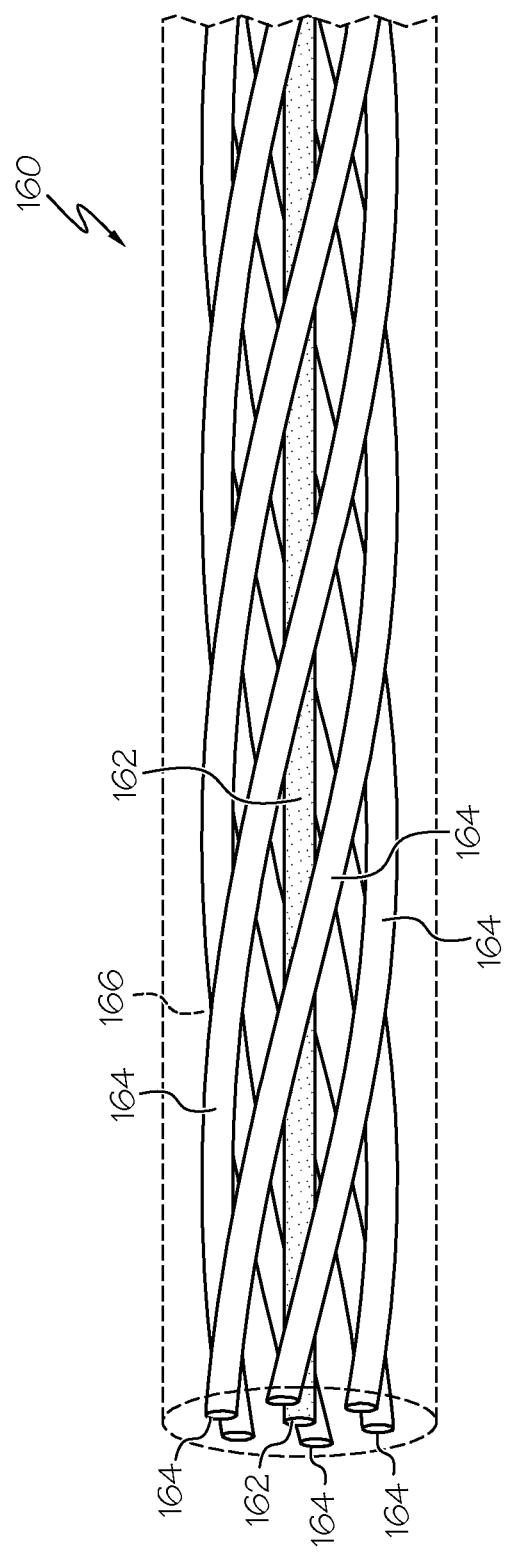
FIG. 4 schematically depicts an example multicore optical fiber link according to the embodiments shown and described herein.

Referring now to FIG. 4, a non-limiting, multicore embodiment of the optical fiber links 160 comprising cores 162, 164 and cladding 166 is depicted. The multicore optical fiber links 160 may comprise single mode multicore optical fibers comprising between about 2 and about 20 cores. Further, the multicore optical fiber links 160 may comprise at least two non-uniform cores structurally configured to provide non-uniform photon propagation delay. The multicore embodiment of the multicore fiber link 160 depicted in FIG. 4 may be disposed in any of the quantum key generation systems 100, 200, 300, described above.

In some embodiments, at least two cores 162, 164 of an individual multicore optical fiber link 160 comprise different refractive index profiles such that photon propagation delay between the at least two cores 162, 164 differs. For example, at least one core of the multicore optical fiber links 160 may comprise a step index profile, a graded index profile, a parabolic index profile, a triangular index profile, or the like. For example, at least one core of the multicore optical fiber links may comprise a refractive index profile of $n(r)^2 = n_1^2(1-2\Delta(r/a)^\alpha)$ where: r comprises a radial position within the core, $n_1$ comprises a refraction index at r=0, α comprises a refractive index constant, a comprises a radius of the cladding 166, and $\Delta = (n_1 - n_2)/n_1$, where $n_2$ comprises a refractive index of the cladding 166. Further, the propagation delay for an optical core having a refractive index constant α is described in Keck, Donald, *Fundamentals of Optical Fiber Communications*, Academic Press, 1981. For example, equation 1.131 on page 59 provides an example of propagation delay for an optical core having a refractive index constant α, describing that:

$$\tau_m = \frac{NL}{c}\left\{1 + \Delta\left[\frac{\alpha-2-\varepsilon}{(\alpha+2)}\right]\left(\frac{m}{M}\right)^{\frac{2\alpha}{\alpha+2}} + \Delta^2\left[\left(\frac{3\alpha-2-2\varepsilon}{2(\alpha+2)}\right)\right]\left(\frac{m}{M}\right)^{\frac{4\alpha}{\alpha+2}}\right\} + 0\Delta^3$$

where $$m = 1, M = n_1 ka\left(\frac{2\Delta\alpha}{\alpha+2}\right)^{\frac{1}{2}},$$

a comprises the radius of an individual core, $\Delta = (n_1-n_2)/n_1$, $n_1$ comprises a refractive index at r=0, $n_2$ comprises a refractive index of the cladding 166, k=2π/λ, λ comprises the wavelength of photons generated by the entangled photon generators or the quantum repeaters of the quantum key entanglement systems 100, 200, 300, α=2 when the refractive index is a parabolic index, α=1 when the refractive index comprises a triangular refractive index, $\alpha=\infty$ when the refractive index comprises a step refractive index. Accordingly, the multicore optical fiber 160 may comprise cores having differing refractive indices, e.g., differing $\alpha$ values, such that each at least two cores provide non-uniform photon propagation delay even in embodiments in which the at least two cores comprise equivalent core lengths.

In some embodiments, the multicore optical fiber links 160 may comprise spun multicore optical fiber links 160 comprising a central core 162 and one or more radially offset cores 164. The spun multicore optical fiber links may comprise any spin configurations, such as unidirectional spin configurations, bidirectional spin configurations, or the like. For example, the spun multicore optical fiber links 160 may comprise a unidirectional spin configuration having a spin profile of $\alpha(z)=\alpha_0$, where $\alpha(z)$ comprises a unidirectional spin profile at a coordinate (z) along the fiber link length and $\alpha_0$ comprises a spin amplitude in turns/unit length. In this embodiment, the spin amplitude $\alpha_0$ may be about 1-10 turns/meter, e.g., about 3-5 turns/meter. Non-limiting example spun multicore optical fiber links may be found in U.S. Pat Pub. No. 2013/0308913 and U.S. Pat. Pub. No. 2011/0129190.

In some embodiments, the spun multicore optical fiber links 160 may comprise a bidirectional spin configuration having a spin profile of $\alpha=\alpha_0 \sin(2\pi z/\Lambda)$, where $\alpha$ comprises a bidirectional spin profile, $\alpha_0$ comprises a spin amplitude in turns/unit length, $\Lambda$ comprises a spin period length, and z comprises a fiber link length. In this embodiment, the spin amplitude $\alpha_0$ may be about 1-10 turns/meter, e.g., about 3-5 turns/meter, the spin period length $\Lambda$ may be about 0.1-50 meters, e.g., about 3-25 meters. In other embodiments, the spun multicore optical fiber links 160 may comprise a square or triangular bidirectional spin profile.

Referring still to FIG. 4, the central core 162 may have a different core length than the one or more radially offset cores 164. For example, in some embodiments, a core optical path length difference between the central core 162 and the individual radially offset core 164 is $$\Delta L = N\left\{[(2a\pi)^2 + \Lambda^2]^{\frac{1}{2}} - \Lambda\right\}$$

where: $\Lambda$ comprises an optical fiber spin length, a comprises a radial distance between the central core 162 and the individual radially offset core 164; and N comprises a total number of spins over the length L of the optical fiber link. Accordingly, the spun multicore optical fiber 160 may comprise cores having differing core lengths such that each at least two cores provide non-uniform photon propagation delay. It should be understood that multicore optical fibers comprising at least two cores that provide non-uniform photon propagation delay may comprise any combination of refractive index profiles, spin configurations, and/or spin profiles.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A quantum key generation system comprising two photon detector units, two photon entanglement chains, and a plurality of multicore fiber links, wherein:
    each photon entanglement chain extends between the two photon detector units;
    each photon entanglement chain comprises at least one quantum repeater and first and second terminating quantum memories;
    the first and second terminating quantum memories are positioned at first and second ends of the photon entanglement chains, respectively;
    the quantum repeater of each photon entanglement chain is structurally configured to entangle a pair of photons;
    the plurality of multicore optical fiber links are structurally configured to optically couple the quantum repeater of each photon entanglement chain to the first and second terminating quantum memories of each photon entanglement chain such that photons received by the first and second terminating quantum memories are entangled with photons entangled by the quantum repeater;

the plurality of multicore optical fiber links each comprise at least two non-uniform cores structurally configured to provide non-uniform photon propagation delay;

the first and second terminating quantum memories of each of the two photon entanglement chains form first and second cross-chain quantum repeaters, respectively, to generate measurable entangled particles at the cross-chain quantum repeaters; and the first and the second photon detector units are structurally configured to receive the measurable entangled particles generated by the first and second cross-chain quantum repeaters, respectively.

2. A quantum key generation system as claimed in claim 1 wherein the two photon entanglement chains are structurally configured to generate correlative quantum key bits receivable by each photon detector unit at a bit rate of between about 1-100 MHz.

3. A quantum key generation system as claimed in claim 1 wherein the two photon entanglement chains are structurally configured to generate correlative quantum key bits receivable by each photon detector unit at a bit rate $\Gamma$ that is within about 10% of a processing rate $\Pi$ of the at least one quantum repeater.

4. A quantum key generation system as claimed in claim 1 wherein the multicore optical fiber links comprise single mode multicore optical fibers comprising between about 2 and about 20 cores.

5. A quantum key generation system as claimed in claim 1 wherein the multicore optical fiber links comprise single mode multicore optical fibers and at least two cores of the multicore optical fiber links comprise different diameters.

6. A quantum key generation system as claimed in claim 1 wherein at least two cores of an individual multicore optical fiber link comprise different refractive index profiles such that photon propagation delay between the at least two cores differs.

7. A quantum key generation system as claimed in claim 6 wherein at least one core of the multicore optical fiber links comprises a refractive index profile of $n(r)^2 = n_1^2(1-2\Delta r a \alpha$ where:

r comprises a radial position within the core;
$n_1$ comprises a refraction index at r=0;
$\alpha$ comprises a refractive index constant;
a comprises a comprises a radius of a cladding;
$\Delta$ comprises $(n_1-n_2)/n_1$; and
$n_2$ comprises a refractive index of the cladding.

8. A quantum key generation system as claimed in claim 1 wherein the multicore optical fiber links comprise spun multicore optical fiber links comprising a central core and one or more radially offset cores.

9. A quantum key generation system as claimed in claim 8 wherein the spun multicore optical fiber links comprise a unidirectional spin configuration having a spin profile of $\alpha(z) = \alpha_0$, where:

$\alpha(z)$ comprises a unidirectional spin profile at a coordinate (z) along the fiber link length; and
$\alpha_0$ comprises a spin amplitude in turns/unit length.

10. A quantum key generation system as claimed in claim 9 wherein the spin amplitude $\alpha_0$ of the spun multicore optical fiber links is between about 1 and about 10 turns/meter.

11. A quantum key generation system as claimed in claim 8 wherein the spun multicore optical fiber links comprise a bidirectional spin configuration having a spin profile of $\alpha = \alpha_0 \sin(2\pi z/\Lambda)$, where:

$\alpha$ comprises a bidirectional spin profile;
$\alpha_0$ comprises a spin amplitude in turns/unit length;
$\Lambda$ comprises a spin period length; and
z comprises a fiber link length.

12. A quantum key generation system as claimed in claim 11 wherein the spin period length $\Lambda$ is between about 0.1 and about 50 meters.

13. A quantum key generation system as claimed in claim 8 wherein the spun multicore optical fiber links comprise a square or triangular bidirectional spin profile.

14. A quantum key generation system as claimed in claim 1 wherein the multicore optical fiber links comprise spun multicore optical fiber links and the core length difference between the central core and an individual radially offset core is $$\Delta L = N\left\{[(2a\pi)^2 + \Lambda^2]^{\frac{1}{2}} - \Lambda\right\}$$

where:
$\Lambda$ comprises an optical fiber spin length;
a comprises a radial distance between the central core and the individual radially offset core; and
N comprises a total number of spins over then length L of the fiber link.

15. A quantum key generation system as claimed in claim 14, wherein at least one core of the spun multicore optical fiber links comprises a refractive index profile of $n(r)^2 = n_1^2 (1-2\Delta(r/a)^\alpha)$ where:

r comprises a radial position within the core;
$n_1$ comprises a refraction index at r=0;
$\alpha$ comprises a refractive index constant;
a comprises a comprises a radius of a cladding;
$\Delta$ comprises $(n_1-n_2)/n_1$; and
$n_2$ comprises a refractive index of the cladding.

16. A quantum key generation system as claimed in claim 15, wherein the spun multicore optical fiber links comprise a unidirectional spin profile or bidirectional spin profile.

17. A quantum key generation system as claimed in claim 1 further comprising one or more alignment mechanisms structurally configured to optically align the quantum repeater with individual cores of the multicore optical fiber links such that the quantum repeater is selectively positioned in optical alignment with an individual core of the multicore optical fiber links.

18. A quantum key generation system as claimed in claim 1 wherein the multicore optical fiber links are structurally configured such that individual cores of the multicore optical fiber links provide photon propagation pathways for one of the photon entanglement chains and other individual cores of the same multicore optical fiber links provide photon propagation pathways for another of the photon entanglement chains.

19. A quantum key generation system as claimed in claim 1 wherein:

the optical fiber links positioned in the photon entanglement chains are structurally configured to receive a calibration signal from an optical time-domain reflectometer for measurement of the core length of the optical fiber links.

20. A quantum key generation system as claimed in claim 1 wherein each photon entanglement chain further comprises an originating entangled photon generator, a first and second intermediate entangled photon generators, and at least two quantum repeaters;

the originating entangled photon generators are positioned at respective origination locations between the first and second ends of the photon entanglement chains;

at least two of the quantum repeaters of each photon entanglement chain comprise first and second intermediate quantum repeaters that are optically coupled to the originating entangled photon generator of the photon entanglement chains by multicore optical fiber links comprising a core of core length L;

the first and second intermediate entangled photon generators of each photon entanglement chain are optically coupled to the first and second intermediate quantum repeaters, respectively, of the photon entanglement chains by multicore optical fiber links comprising a core of core length L;

the first and second intermediate entangled photon generators of each photon entanglement chain are optically coupled to the first and the second terminating quantum memories, respectively, of the photon entanglement chains by multicore optical fiber links comprising a core of core length L', where L'>L;

the originating entangled photon generators, the first intermediate entangled photon generators, and the second intermediate entangled photon generators are each structurally configured to generate an entangled pair of photons; and the first and second intermediate quantum repeaters of each photon entanglement chain are structurally configured such that an entangled pair of photons generated by the originating entangled photon generator are entangled with an entangled pair of photons generated by the first and second intermediate entangled photon generators, respectively.

21. A quantum key generation system as claimed in claim 1 wherein at least one quantum repeater of each photon entanglement chain further comprises an originating quantum repeater positioned at respective origination locations between the first and second ends of the photon entanglement chains;

each photon entanglement chain comprises first and second intermediate entangled photon generators optically coupled to the originating quantum repeater of the photon entanglement chains by multicore optical fiber links comprising a core of core length L;

the first and second intermediate entangled photon generators of each photon entanglement chain are optically coupled to the first and the second terminating quantum memories, respectively, of the photon entanglement chains by multicore optical fiber links comprising a core of core length L', where L'>L;

the first and second intermediate entangled photon generators are each structurally configured to generate an entangled pair of photons; and the originating quantum repeaters of each photon entanglement chain are structurally configured such that an entangled pair of photons generated by the first intermediate entangled photon generators are entangled with an entangled pair of photons generated by the second intermediate entangled photon generators, respectively.

22. A quantum key generation system as claimed in claim 1 wherein:

each photon entanglement chain further comprises at least two quantum repeaters disposed between the first and second terminating quantum memories of each photon entanglement chain;

the at least two quantum repeaters are adjacently positioned and optically coupled by multicore fiber links;

each quantum repeater is structurally configured to entangle a pair of photons and output an individual entangled photon into a multicore fiber link; and each quantum repeater is structurally configured to receive an individual entangled photon output by an adjacently positioned quantum repeater.

23. A quantum key generation system as claimed in claim 22 wherein:

the at least two quantum repeaters of each photon entanglement chain each comprise two quantum memories and entanglement optics; and the entanglement optics comprises two or more entangling pathways optically coupled to and extending between the two quantum memories and two entanglement detectors.

24. A quantum key generation system as claimed in claim 23 wherein:

the entanglement optics further comprise a beamsplitter positioned such that each entangling pathway traverses the beamsplitter; and the entanglement optics are structurally configured to entangle pairs of particles when particles output by the quantum memories simultaneously traverse the beamsplitter.

25. A quantum key generation system comprising two photon entanglement chains, two photon detector units, and a plurality of multicore fiber links, wherein each photon entanglement chain extends between the two photon detector units;

the plurality of multicore optical fiber links are structurally configured to optically couple a quantum repeater of each photon entanglement chain to first and second terminating quantum memories of each photon entanglement chain; and the two photon entanglement chains are structurally configured to generate correlative quantum key bits receivable by each photon detector unit at a bit rate of between about 1-100 MHz.

26. A quantum key generation system as claimed in claim 25, wherein the plurality of multicore fiber links comprise each comprise at least two non-uniform cores structurally configured to provide non-uniform photon propagation delay.

27. A quantum key generation system comprising two photon entanglement chains, two photon detector units, and a plurality of multicore fiber links, wherein each photon entanglement chain extends between the two photon detector units;

the plurality of multicore optical fiber links are structurally configured to optically couple a quantum repeater of each photon entanglement chain to first and second terminating quantum memories of each photon entanglement chain; and the two photon entanglement chains are structurally configured to generate correlative quantum key bits receivable by each photon detector unit at a bit rate $\Gamma$ that is within about 10% of a processing rate $\Pi$ of the at least one quantum repeater.

28. A quantum key generation system as claimed in claim 27, wherein the plurality of multicore fiber links comprise each comprise at least two non-uniform cores structurally configured to provide non-uniform photon propagation delay.

29. A quantum key generation system as claim in claim 27, further comprising an entangled photon generator optically coupled to the quantum repeater and structurally configured to generate an entangled pair of photons.

30. A quantum key generation system comprising two photon entanglement chains, two photon detector units, and a plurality of multicore fiber links, wherein each photon entanglement chain extends between the two photon detector units;

the plurality of multicore optical fiber links are structurally configured to optically couple a quantum repeater of each photon entanglement chain to first and second terminating quantum memories of each photon entanglement chain; and the two photon entanglement chains are structurally configured to generate correlative quantum information receivable by each photon detector unit at a bit rate $\Gamma$ that is within about 10% of a processing rate $\Pi$ of the at least one quantum repeater.

* * * * *